US008549727B2

(12) United States Patent
Lee et al.

(10) Patent No.: US 8,549,727 B2
(45) Date of Patent: Oct. 8, 2013

(54) PUNCH-DOWN TOOL BLADE WITH EXTENDED REACH

(76) Inventors: Boyd M. Lee, Savage, MN (US); Joseph M. Ambright, Lino Lakes, MN (US)

( * ) Notice: Subject to any disclaimer, the term of this patent is extended or adjusted under 35 U.S.C. 154(b) by 1018 days.

(21) Appl. No.: 12/535,654

(22) Filed: Aug. 4, 2009

(65) Prior Publication Data

US 2010/0031492 A1 Feb. 11, 2010

Related U.S. Application Data

(60) Provisional application No. 61/086,219, filed on Aug. 5, 2008.

(51) Int. Cl.

| | |
|---|---|
| ***B23P 23/00*** | (2006.01) |
| ***H01R 43/00*** | (2006.01) |
| ***H01R 43/22*** | (2006.01) |

(52) U.S. Cl.
USPC .......... 29/566.4; 29/750

(58) Field of Classification Search
USPC .......... 29/566.4, 566.3, 750, 752, 758; 81/177.2
See application file for complete search history.

(56) References Cited

U.S. PATENT DOCUMENTS

| | | | | |
|---|---|---|---|---|
| 3,883,316 | A * | 5/1975 | Mason | 29/566.4 |
| 4,161,061 | A | 7/1979 | Mason et al. | |
| 4,241,496 | A * | 12/1980 | Gregson | 29/566.4 |
| 4,656,725 | A * | 4/1987 | Knickerbocker | 29/566.4 |
| 4,696,090 | A * | 9/1987 | Gregson et al. | 29/566.4 |
| 6,058,600 | A * | 5/2000 | Leu | 29/566.4 |
| 6,615,480 | B1 * | 9/2003 | Murphy | 29/566.4 |
| 7,096,564 | B2 * | 8/2006 | Sullivan | 29/566.4 |
| 7,266,878 | B1 | 9/2007 | Sullivan | |
| 8,296,936 | B2 * | 10/2012 | Lin | 29/566.4 |
| 2004/0211300 | A1 * | 10/2004 | Wang | 81/177.2 |

* cited by examiner

*Primary Examiner* — Erica E Cadugan
(74) *Attorney, Agent, or Firm* — James L. Lund, Esq.

(57) ABSTRACT

Disclosed is a punch-down tool blade suited for seating, and seating and cutting data transmission and telephony wires into crowded patch panels. Also disclosed are embodiments of an elongated punch-down tool blade having a slidable locking collar which may be used in reversibly locking a punch-down tool blade with either the seating tip being used as the working tip or the seating and cutting tip used as the working tip without compromising both the ability of the tool tip to gain access to terminating clips or the tradesman's visibility of terminating clips so that patch panels may be efficiently and accurately wired while providing enhanced safety and decreased worker fatigue.

14 Claims, 7 Drawing Sheets

PUNCH-DOWN TOOL BLADE WITH EXTENDED REACH

FIELD

The invention generally pertains to the field of tools used in assembling data/telephony networks, and more particularly to punch-down tools used to insert or insert and terminate transmission wires into patch panels.

BACKGROUND

The information superhighway has grown exponentially over the past two decades. The internet has created a multitude of ways in which people across the earth can communicate. Junction boxes, or patch panels are commonly used in data rooms to make the multitude of physical connections between end-user lines with various types of data switches, bridges, and routers, which in turn are connected to local internet service providers, regional access routers to high bandwidth back-haul providers across long distances to distant regional access providers, internet service providers and ultimately distant end users. Punch-down tools are used to connect signal wires into such patch panels. Two common patch panel types are 110 data patch panels and 66 cat3 telephony patch panels, where 110 and 66 pair of twisted wire are connected, respectively. Because the demand for such connections is increasing at such a large rate, patch panels increasingly become utilized to their full capacity; consequently, they become so crowded with wires that it often becomes difficult to insert wires into the terminal clip of a patch panel using a standard punch tool blade. U.S. Pat. No. 4,161,061 shows such a wire insertion/cutoff device having a blade with insertion end, as well as an insertion/cutoff end. The blade extends about one inch past a rather blunt large diameter punch-down tool. The proximity of the blade end being used to the bulky punch-down tool creates difficulties in connecting wires in the tight patch panels. Difficulties include the blunt end of the tool precluding the tip of the device from gaining access to the proper punch-down point on a terminal clip of the patch panel, the blunt end dislodging other terminated wires in the panel when the installer attempts to add new wires to the patch panel, and the bulky tool blocking the tradesman's view of the terminal clips so that connecting wires to patch panels is prone to faulty or incorrect connections. U.S. Pat. No. 7,266,878 shows a device that, while extending the overall length of a punch-down tool, still possess the above-mentioned problems. The diameter of the extension is about twice the diameter of the body of the standard short seating tip or seating and cutting tip that is inserted into the extension, and about four times the tip's width. Consequently, this large diameter still blocks the tradesman's access and view of the terminal clips, and the abrupt edges or ledges of the assembled tool readily snag adjacent wires when the tradesman attempts to use the device, thus providing little benefit in use. Furthermore, the tradesman must carry several tips with him, and piece together the parts which can become easily lost when dropped, creating constant inconveniences to the tradesman. What is needed is a punch-down blade which enables the reliable connection of wires in patch panels which are crowded to capacity, while preventing tool entanglement and the accidental dislodgment of connected wires.

The present disclosure discloses a punch-down tool which solves many of these problems that are associated with existing punch-down tools. It will be appreciated that the disclosure may disclose more than one invention. The invention(s) is (are) pointed out with particularity in the claims annexed hereto and forming a part hereof.

BRIEF SUMMARY

The invention(s) generally relate to punch-down tool blades that are suited for seating, and/or seating and cutting, wires in terminal clips of crowded patch panels and are configured to provide unimpeded visual and physical access to the terminal clips. In addition, the invention(s) generally relate to punch-down tool blades configured to incorporate mechanisms that allow the punch-down blades to lock into a punch-down tool in either of two orientations without increasing the profile width at the blade's working tip (the end of the blade proximate to the patch panel).

In the first two embodiments, the apparatus comprises a long slender punch-down tool blade where the blade may comprise either a seating tip or a seating and cutting tip where the punch-down blade may be fixed into place in the punch-down tool.

A third embodiment of the tool comprises a punch-down tool blade having a long slender profile and a seating tip at one end and a seating and cutting tip at the other end, where each end is located distally from one another.

A fourth embodiment of the tool comprises a punch-down tool blade assembly having a long slender profile and a seating tip at one end and a seating and cutting tip at the other end, where means are provided to lock the punch-down blade into the punch-down tool without increasing the width or diameter of the blade in the region of the blade which is proximate the working tip.

The fifth and sixth exemplary embodiments show slidable locking collar mechanisms, where the locking collar may be moved to the end of the blade to be inserted into the punch-down tool, thereby retaining the slim non-tangling blade profile at the blade's working end.

The overall length of the several embodiments is from 4 to 10 inches, with an overall length of from 5 to 9 inches being preferred. Most preferably, the overall length is from 7 to 7½ inches.

One advantage of the present apparatus is to save the tradesman valuable time in installing networking services, thus allowing him or her to better compete in the workplace. In addition, time is saved by making the connection of physical networks of wires more efficient and reliable by allowing the blade tip to reach destination terminals without getting entangled, and dislodging other connected wires in the patch panel. The tradesman is saved not only the inconvenience of having to troubleshoot non-working data circuits caused by faulty patch panel connections, but also the stress, financial loss, and inconvenience of being called back to job sites to fix the problems and salvage relationships with dissatisfied customers.

Another advantage of one embodiment is that the punch-down blade allows the tradesman to keep the punch-down tool itself, as well as his or her hands away from all of the wires, thus providing the tradesman a greater view of the terminal clips for more accurate and successful placement of the device to make the proper connections, as well as enhanced safety. Consequently, the punch-down tool blade saves the tradesman the inconvenience of suffering strained arm, hand, and finger muscles and ligaments which readily occurs with standard punch-down tool blades while inefficiently seating and cutting wires in patch panels.

The invention(s) is (are) pointed out with particularity in the claims annexed hereto and forming a part hereof.

DETAILED DESCRIPTION

Figure 1:
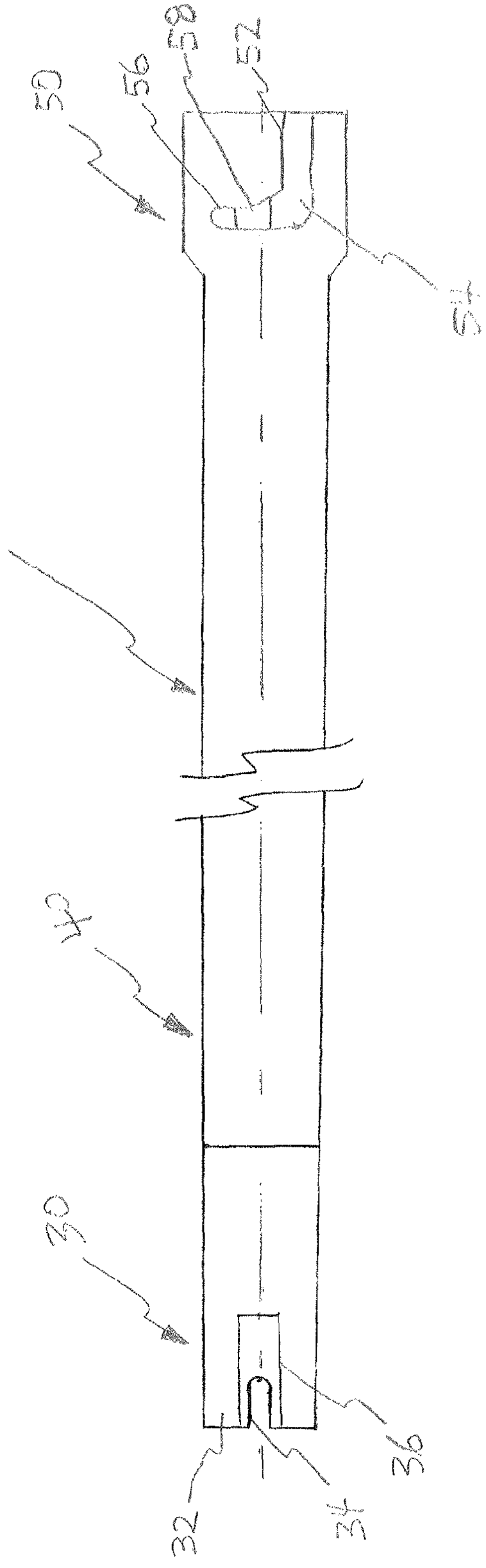
FIG. 1 is a first embodiment of a punch-down tool blade well suited for seating wires to terminal clips in patch panels.

Referring to the drawings, where like reference numerals generally designate identical or corresponding parts throughout the several views, and more particularly to FIG. 1, there is shown a first embodiment of a punch-down tool, more particularly, a punch-down tool blade well suited for seating wires into terminal clips in patch panels, designated generally by the numeral 20.

The punch-down tool blade 20 includes a working tip section 30, a long slender section 40, and a locking collar section 50. The working tip section 30 includes a seating edge 32, an elongated slot 34, and a groove 36 formed therein, which conforms to the shape of a terminal located on a terminal block (not shown) used in terminating telephone and data conducting wires. The long slender section 40 comprises a length of material having the structural rigidity to transfer forces down its axis without buckling. The locking collar section 50 comprises an L-shaped groove 52 having a lead-in detent 54 and a locking detent 56 on either side of cam surface 58 as shown and described in U.S. Pat. No. 4,161,061, incorporated herein by reference.

The overall length of the first embodiment is from 4 to 10 inches, with an overall length of from 5 to 9 inches being preferred. Most preferably, the overall length is from 7 to 7½ inches.

Figure 2:
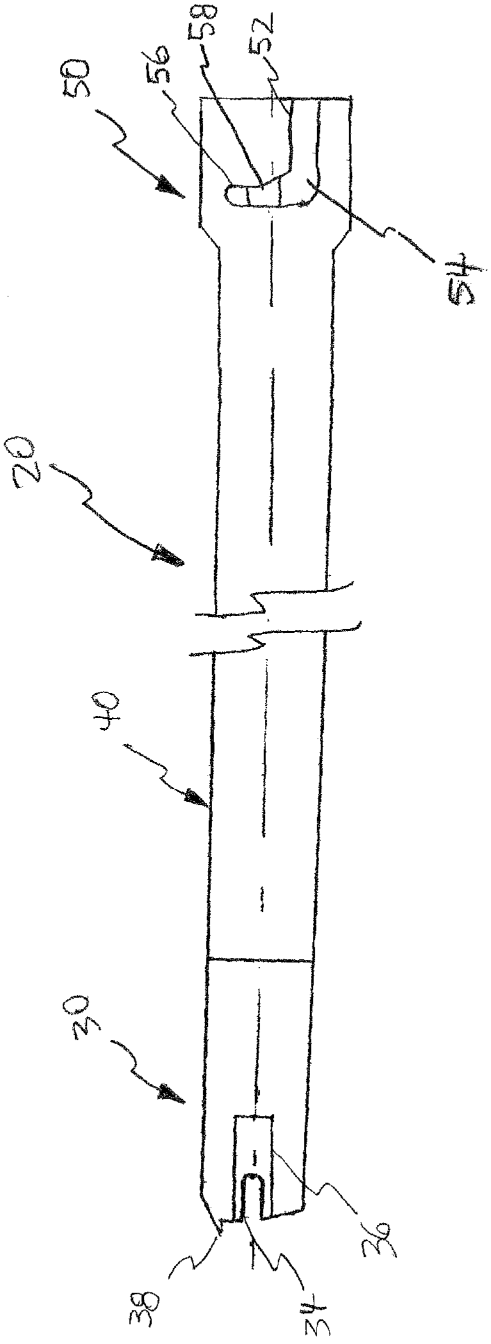
FIG. 2 is a second embodiment of a punch-down tool blade well suited for the seating and cutting wires in patch panels.

Referring now to FIG. 2 there is shown a second embodiment, similar to that of first except that the working tip section includes a seating and cutting edge 38. The overall length of the second embodiment is from 4 to 10 inches, with an overall length of from 5 to 9 inches being preferred. Most preferably, the overall length is from 7 to 7½ inches.

In use, the tradesman inserts the locking collar section 50 of the punch-down blade 20 into a punch-down tool (not shown) so that a cam follower spring (not shown) enters the L-shaped groove 52 at the lead-in detent 54, then rotates the punch-down blade 20 clockwise relative to the punch-down tool until the cam follower spring rides up and over a cam surface 58, finally coming to rest in the locking detent 56. With the punch-down blade in place, the tradesman then may seat wires (FIG. 1), or seat and cut wires (FIG. 2) in a patch panel by locating the wire within the elongated slot and pushing the wire into the terminal of the patch panel.

Figure 3:
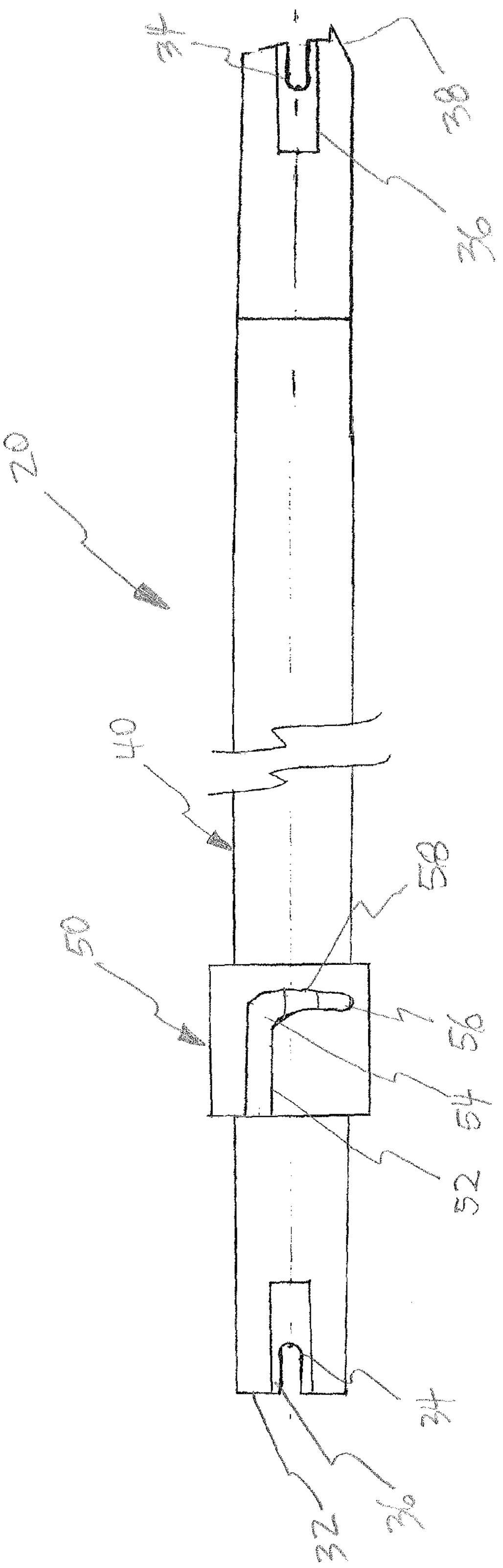
FIG. 3 is a third embodiment of a punch-down tool blade having one end well suited for the seating wires to terminal clips in patch panels, and another end well suited for the seating and cutting of wires in patch panels.

Referring now to FIG. 3, there is shown a third embodiment of a punch-down tool blade having one end, which includes seating edge 32, well suited for the seating wires to terminal clips in patch panels, and another end, which includes seating and cutting edge 38, well suited for the seating and cutting of wires in patch panels. This embodiment incorporates a fixed locking collar section 50 located near the blade tip used less frequently, which is usually the seating tip (most connections are typically of the seating and terminating type). Please note that in FIG. 3 the fixed locking collar section 50 is shown adjacent the blade edge with the seating tip; however, in a related embodiment the fixed locking collar section 50 may be located adjacent the blade edge with the seating and cutting tip. In this related embodiment the L-shaped groove would be oriented such that the "L" in the figure would be pointing up towards the top of the figure to show that fixing the punch-down tool blade to the punch-down tool would still be accomplished by insertion, as described above, with the same clockwise twist of the blade relative to the punch-down tool to locate the biased ball bearing within locking detent 56. Typical punch-down tools made by such manufacturers as Paladin and Harris have a recessed portion which accommodates the portion of the punch-down blade directly adjacent the locking collar section, that is, the tip section not being presently used.

The overall length of the third embodiments is from 4 to 10 inches, with an overall length of from 5 to 9 inches being preferred. Most preferably, the overall length is from 7 to 7½ inches.

In use, the tradesman chooses which tip (seating or seating and cutting) he or she would like to presently use (i.e. the working tip), and inserts the non-working tip end of the punch-down blade 20 into the punch-down tool (not shown). If the non-working tip section is the end with the fixed locking collar section 50 on it, the locking collar section 50 of the punch-down blade 20 is also inserted into a punch-down tool (not shown) so that a cam follower spring of the punch-down tool enters the L-shaped groove 52 at the lead-in detent 54, then rotates the punch-down blade 20 clockwise relative to the punch-down tool until the cam follower spring rides up and over a cam surface 58, finally coming to rest in the locking detent 56. If the non-working tip section is not the end with the fixed locking collar section 50 on it, the non-working tip section is simply inserted into the punch-down tool. Please note that a small shoulder section may be present in these embodiments to help transfer the impulse load transfer from the punch-down tool to the punch-down tool blade when the infrequently used tip needs to be used.

With the punch-down blade in place, the tradesman then may seat wires, or seat and cut wires, in a patch panel by locating the wire within the elongated slot of the working tip and pushing the wire into the terminal of the patch panel with the punch-down tool.

Figure 4:
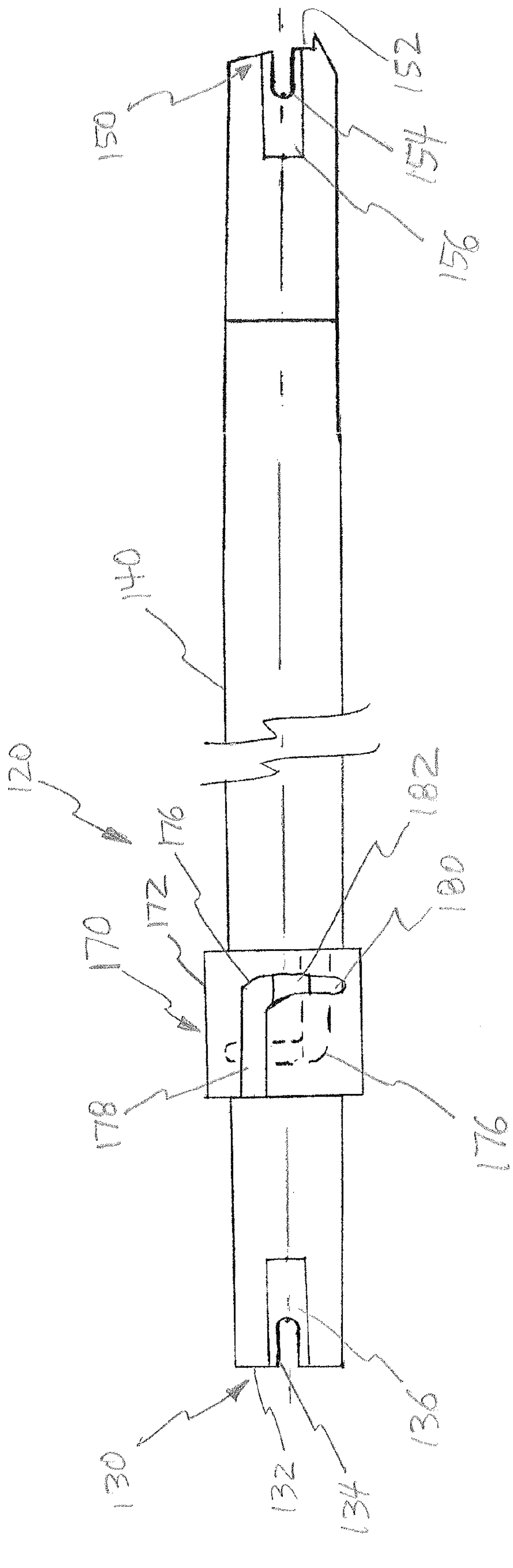
FIG. 4 is a fourth embodiment of a punch-down tool blade assembly having one end well suited for seating wires to terminal clips in patch panels, and another end well suited for the seating and cutting of wires in patch panels. This embodiment provides means to fix the punch-down blade into the punch-down tool without increasing the width or diameter of the blade in the region of the blade which is proximate the working tip (the tip which engages the wire to be connected) and incorporates sliding collar mechanisms for locking the punch-down blade into the punch-down tool.

Referring now to FIG. 4, there is shown a fourth embodiment of a punch-down tool blade where means are provided to lock the punch-down blade into the punch-down tool, using either tip as the working tip, without increasing the width or diameter of the blade in the region of the blade which is proximate the working tip. This embodiment comprises a punch-down tool blade assembly designated generally by the numeral 120. The punch-down tool blade 120 includes a seating tip section 130, a long slender section 140, a seating and cutting tip section 150, and a slidable locking collar mechanism 170. The seating tip section 130 includes a seating edge 132, an elongated slot 134, and a groove 136 formed therein, which conforms to the shape of a terminal located on a terminal block (not shown) used in terminating telephone or data conducting wires. The long slender section 140 comprises a length of material having the structural rigidity to transfer forces down its axis without buckling. The overall length of the fourth embodiments is from 4 to 10 inches, with an overall length of from 5 to 9 inches being preferred. Most preferably, the overall length is from 7 to 7½ inches. The seating and cutting tip section 150 includes a seating and cutting edge 152, an elongated slot 154, and a groove 156 formed therein, which conforms to the shape of a terminal located on a terminal block (not shown) used in terminating telephone and data conducting wires.

The punch-down tool blade assembly 120 also includes a slidable locking collar mechanism designated generally by the numeral 170. Collar body 172 may have an outer surface configured in any number of ways to enhance the application of torque to it, for example it may be roughened or made angular for ease of tightening either manually or with the use of a tool, such as a wrench or pliers. In addition, the outer surface of the collar body 172 contains two L-shaped grooves 176, each having a lead-in detent 178 and a locking detent 180 on either side of a cam surface 182. The downward pointing "L" shaped groove depicted in FIG. 4 is for use in the configuration where the seating and cutting edge of the punch-down tool blade is being used. The second L-shaped groove, shown in phantom in FIG. 4 as an upward pointing "L" and is for use in the configuration where the seating edge of the punch-down tool blade is being used. In each case the L-shaped groove is configured to be inserted into the punch-down tool and twisted clockwise relative to the punch-down tool so that the cam follower spring of the punch-down tool (not shown) slides up the lead-in detent 178, rides up and over the cam surface 182 and into the locking detent 180.

In use, the tradesman chooses which tip 130 or 150 of the punch-down blade 120 he or she would like to presently use. The collar body 172 is located toward the non-working tip end and locked into place on the long slender section 140 through various means including, but not limited to, a set screw (not shown) threaded through the collar body 172 and impinging upon the long slender section 140. Other means for locking the collar body 172 with respect to the long slender section 140 include, for example, various bayonet-type mechanisms, threads bottoming to a shoulder, the use of lock washers of various types, or threading arrangements where there is a slight amount of interference between female threads on an inside bore of the collar body 172 and male threads on the long slender section 140 such as, for example, lobed thread arrangements, or nylon threaded inserts. After the collar body 172 has been fixed relative to the long slender section 140, the non-working tip end of the punch-down blade 120, with the fixed locking collar section 170 on it, is inserted into the punch-down tool (not shown) so that a cam follower spring of the punch-down tool enters the L-shaped groove 178 at the lead-in detent 176. The tradesman then rotates the punch-down blade 120 clockwise relative to the punch-down tool until the cam follower spring rides up and over a cam surface 182, finally coming to rest in the locking detent 180. With the punch-down blade in place, the tradesman then may seat wires, or seat and cut wires, in a patch panel by locating the wire within the elongated slot of the working tip and pushing the wire into the terminal of the patch panel with the punch-down tool.

Figure 5:
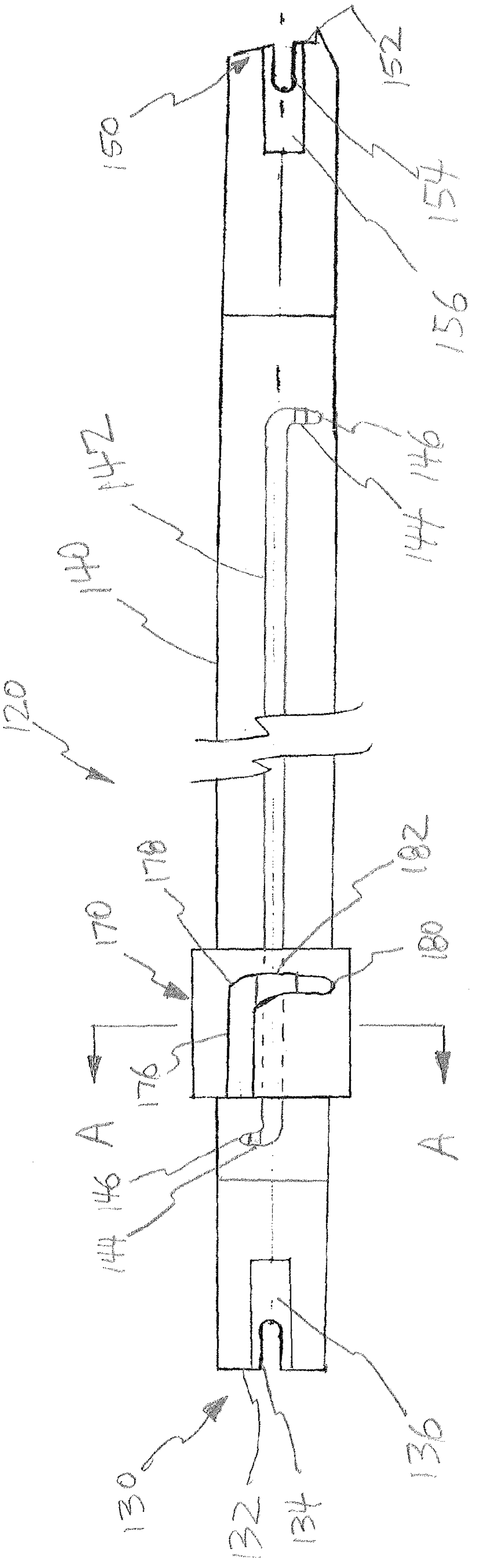
FIG. 5 is a fifth embodiment of a punch-down tool blade assembly having one end well suited for seating wires to terminal clips in patch panels, and another end well suited for the seating and cutting of wires in patch panels. This embodiment has a slidable locking collar mechanism which may be moved to the end which is inserted into the punch-down tool, therefore retaining the slim nontangling blade profile at its working end.
Figure 6:
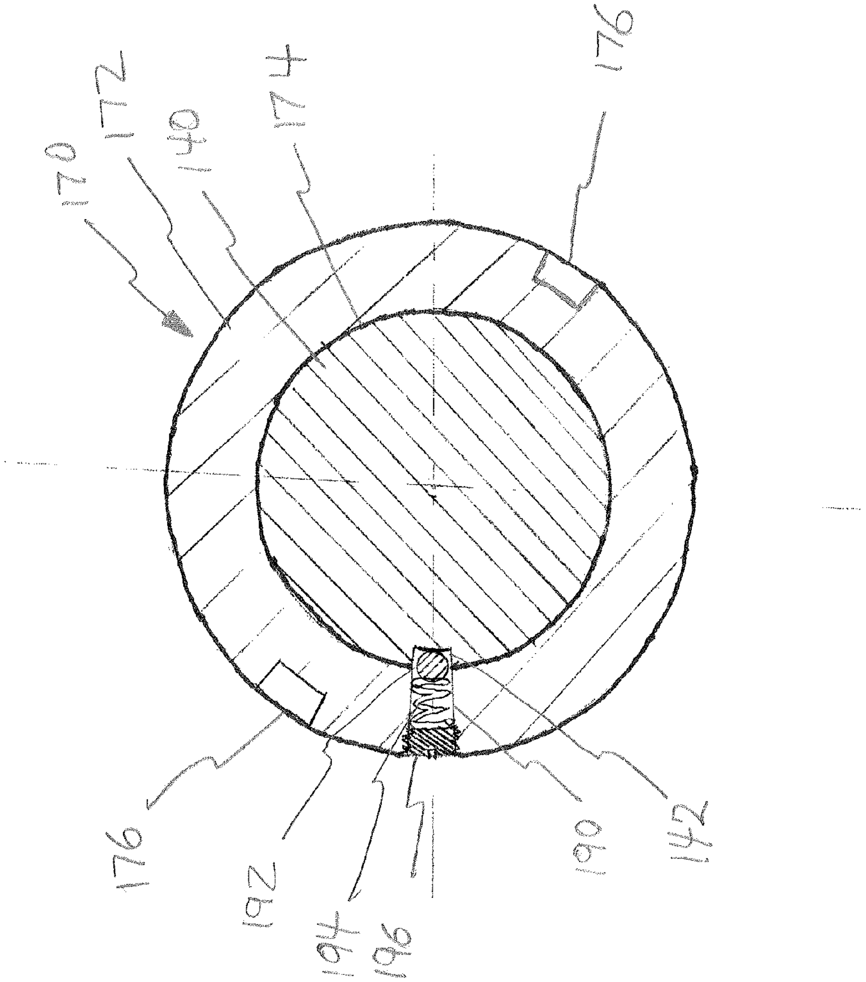
FIG. 6 is a sectional view of the fifth embodiment of a punch-down blade assembly showing an embodiment of a slidable locking collar mechanism.

Referring now to FIGS. 5 and 6, there is shown a fifth embodiment of a punch-down tool blade. This embodiment comprises a punch-down tool blade assembly designated generally by the numeral 120. The punch-down tool blade 120 includes a seating tip section 130, a long slender section 140, a seating and cutting tip section 150, and a slidable locking collar mechanism 170. The seating tip section 130 includes a seating edge 132, an elongated slot 134, and a groove 136 formed therein, which conforms to the shape of a terminal located on a terminal block (not shown) used in terminating telephone and data conducting wires. The long slender section 140 comprises a length of material having the structural rigidity to transfer forces down its axis without buckling. The overall length of the fifth embodiments is from 4 to 10 inches, with an overall length of from 5 to 9 inches being preferred. Most preferably, the overall length is from 7 to 7½ inches. In the present embodiment, the long slender section 140 comprises a rod of material having a circular cross section as shown in FIG. 6, although other cross sections, such as that of a hollow tube are envisioned as well. The long slender section 140 also includes a longitudinal detent groove 142 which runs from a location proximate the seating tip section 130 axially along the long slender section 140 to a location proximate the seating and cutting tip section 150. At each end of the longitudinal detent groove 142 there is located a collar locking cam 144 and a collar locking detent 146. The seating and cutting tip section 150 includes a seating and cutting edge 152, an elongated slot 154, and a groove 156 formed therein, which conforms to the shape of a terminal located on a terminal block (not shown) used in terminating telephone conducting wires.

The punch-down tool blade assembly 120 also includes a slidable locking collar mechanism designated generally by the numeral 170. The slidable locking collar mechanism 170 comprises a collar body 172 which has an inner diameter 174 which mates up against the outer diameter of the long slender section 140, forming a bearing surface there between. Collar body 172 may have an outer surface configured in any number of ways to enhance the application of torque to it, for example it may be roughened or made angular for ease of tightening either manually or with the use of a tool, such as a wrench or pliers. In addition, collar body 172 contains two L-shaped grooves 176, each having a lead-in detent 178 and a locking detent 180 on either side of a cam surface 182. The downward pointing "L" shaped groove depicted in FIG. 5 is for use in the configuration where the seating and cutting edge of the punch-down tool blade is being used. The second L-shaped groove, if shown in phantom in FIG. 5 would be an upward pointing "L" and is for use in the configuration where the seating edge of the punch-down tool blade is being used. (In each case the L-shaped groove is configured to be inserted into the punch-down tool and twisted clockwise relative to the punch-down tool so that the cam follower spring of the punch-down tool (not shown) slides up the lead-in detent 178, rides up and over the cam surface 182 and into the locking detent 180.) The collar body 172 also contains a through bore 190 (see FIG. 6) which houses a biased ball 192, or other elastically biased member, which rides in the longitudinal detent groove 142 of the long slender section 140 of the punch-down tool blade assembly 120. The ball 192 is biased by a spring 194, or other bias providing means, and is free to glide along the detent groove 142 and with a bit of applied torque, up and over the cam surface 144 and into the locking detent 146 so that the slidable locking collar mechanism 170 may be locked in place relative to the long slender section 140. Biasing spring 194 is held in place by a screw 196 which is threaded into the outer portion of the through bore 190.

In use, the tradesman chooses which end of the punch-down blade he or she would like to use, the working tip, and locks the slidable collar body 172 in place at the end of the long slender section 140 opposite the working tip end by sliding the slidable collar body 172 longitudinally along the long slender section 140 until the ball 192 reaches the end of the detent groove 142. The ball 192 is biased into detent groove 142 by spring 194 butted against screw 196 in the side of the slidable collar body 172. Then torque sufficient to removably lock the slidable collar 172 into place on the body of the punch-down blade 120 is applied through the use of finger pressure, or through the use of a tool such as a wrench or pliers. This applied torque, in effect, provides the energy to allow the biased ball 192 to transverse circumferentially from the longitudinal detent groove 142 up and over the collar locking cam 144, thereby further compressing the spring 194, and into the collar locking detent 146. Then the non-working tip is inserted into the punch-down tool so that the biased cam follower member of the punch-down tool (not shown) is aligned with the lead-in detent 178 of the collar body L-shaped groove 176, moving the punch-down tool blade 120 further inside the receptacle of the punch-down tool, with clockwise torque applied to the punch-down blade 120 with respect to the punch-down tool, so that the biased cam follower (not shown) rides up and over the cam surface 182 and into the locking detent 180 of the collar body L-shaped groove 176, thus reversibly locking the punch-down blade 120 into place with respect to the punch-down tool. The tool is now ready for use and can efficiently seat or seat and cut wires into terminal clips of crowded patch panels efficiently without either tangling the device in the wires, or inadvertently seating to the incorrect terminal clip because the punch-down tool has obstructed the tradesman's vision of terminal clips.

When the tradesman wishes to use the other tip (e.g. the other tip will become the working tip), he or she simply reverses the assembly steps above, e.g. applies counterclockwise torque to the punch-down blade 120 relative to the punch-down tool (not shown), removes the punch-down blade 120 from the punch-down tool, and releases the biased ball 192 of the slidable collar body 172 from the locking detent 180 of the long slender section 140 by applying torque using finger pressure or a torque-applying tool such as a pliers or wrench. This applied torque, in effect, provides the energy to allow the biased ball 192 to transverse circumferentially from the collar locking detent 146 up and over the collar locking cam 144 and into the longitudinal detent groove 142. Then the tradesman slides the slidable collar body 172 longitudinally to the other end of the punch-down blade 120, and tightens the slidable collar body 172 by applying enough torque to allow the biased ball 192 to transverse circumferentially from the longitudinal detent groove 142 up and over the second collar locking cam 144 and into the second collar locking detent 146. Then the non-working blade end is inserted into the punch-down tool so that the biased cam follower member of the tool (not shown) is aligned with the lead-in detent 178 of the second, opposite facing, collar body L-shaped groove 176 of the slidable collar body 172, moving the punch-down tool blade 120 further inside the receptacle of the punch-down tool, with clockwise torque applied to the punch-down blade 120 with respect to the punch-down tool, so that the biased cam follower (not shown) rides up and over the cam surface 182 and into the locking detent 180 of the collar body L-shaped groove 176, thus reversibly locking the punch-down blade 120 into place with respect to the punch-down tool. Now the tool is ready for use in its alternate configuration.

Figure 7:
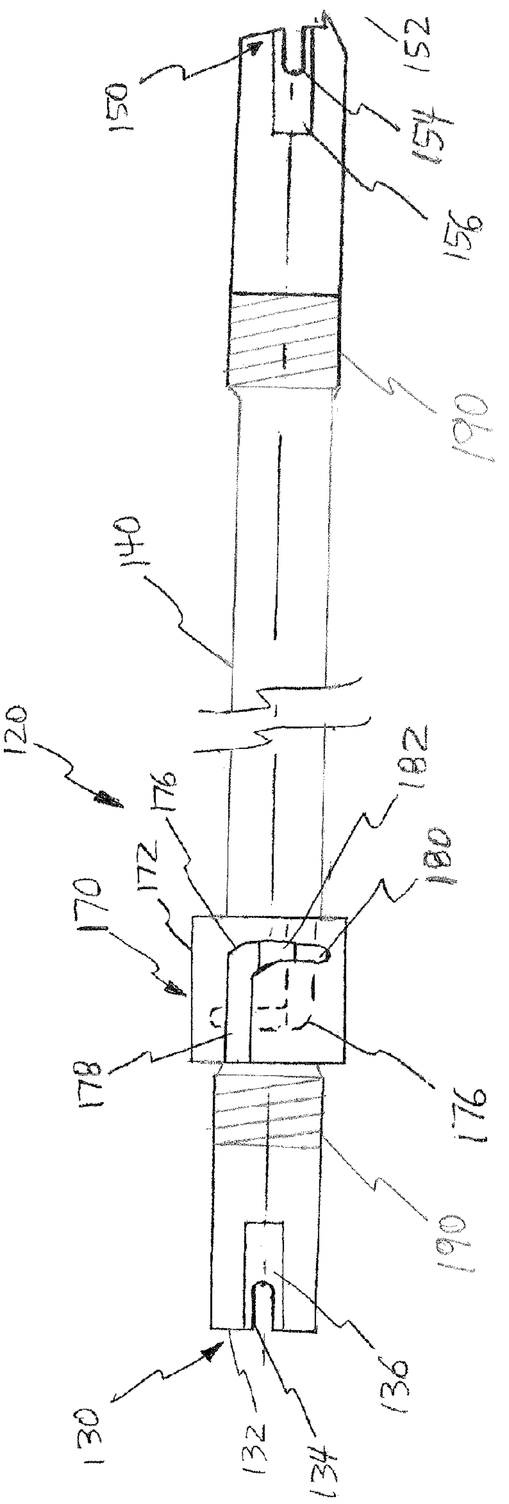
FIG. 7 is a sixth embodiment of a punch-down tool blade assembly having one end well suited for seating wires to terminal clips in patch panels, and another end well suited for the seating and cutting of wires in patch panels. This embodiment shows another slidable locking collar mechanism which may be moved to the end which is inserted into the punch-down tool, therefore retaining the slim nontangling blade profile at its working end.
Figure 8:
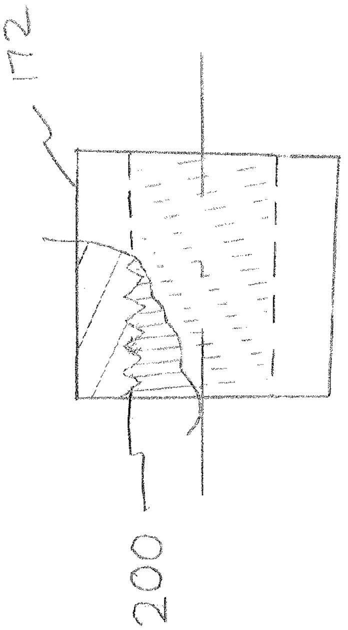
FIG. 8 is a side view with partial longitudinal section of the slidable threaded collar of the sixth embodiment.

Referring now to FIG. 7, there is shown a sixth embodiment of a punch-down tool blade. This embodiment comprises a punch-down tool blade assembly designated generally by the numeral 120. The punch-down tool blade 120 includes a seating tip section 130 and a seating and cutting tip section 150, similar to those in the fifth embodiment, a long slender section 140, and a slidable locking collar mechanism 170. Collar body 172 may have an outer surface configured in any number of ways to enhance finger grip or to allow tools, such as a wrench or pliers to be used to apply torque to it. In addition, the outer surface of the collar body 172 contains two L-shaped grooves 176, each having a lead-in detent 178 and a locking detent 180 on either side of a cam surface 182. The downward pointing "L" shaped groove depicted in FIG. 4 is for use in the configuration where the seating and cutting edge of the punch-down tool blade is being used. The second L-shaped groove, shown in phantom in FIG. 4 as an upward pointing "L" and is for use in the configuration where the seating edge of the punch-down tool blade is being used. (In each case the L-shaped groove is configured to be inserted into the punch-down tool and twisted clockwise relative to the punch-down tool so that the cam follower spring, or other biasing member, of the punch-down tool (not shown) slides up the lead-in detent 178, rides up and over the cam surface 182 and into the locking detent 180.)

In this embodiment, the slidable locking collar mechanism 170 comprises external threads 190 disposed at either end of the punch-down tool blade which engage with collar body internal threads 200, thus allowing the collar body 172 to be locked into position at either end of the punch-down blade. A clearance is provided between the outer surface of the long slender section 140 and the inside diameter of the internal threads 200 which allows the slidable collar body 172 to freely slide along the long slender section 140 of the tool. Although the external threads 190 are generally shown as encircling a circular cross section of a long slender section 140, a long slender section 140 of non-circular cross section may be used equally effectively whereby the external threads encompass only a portion of the outer surface of the cross section. In other words, the cross section of the long slender section 140 could be generally rectangular with threads formed only on the two outer surfaces most distant from the central axis of the long slender section 140. Locking the collar body 172 into place may be achieved when the end of either the external threads 190 or internal threads 200 is reached when screwing the two components together and an external or internal shoulder is reached, respectively. The use of thread sets having a slight amount of interference between them, such as those provided by threaded nylon inserts for the internal threads 200 (commonly used, for example, in locknuts available at hardware stores), or by the use of lobed or slightly tapered external threads 190 and/or internal threads 200. The use of various types of lock washers, or lock washer features incorporated into the collar body 172, is also contemplated in helping fix the collar body 172 in place on the long slender section 140 of the punch-down tool blade assembly 120.

In use, the tradesman chooses which end of the punch-down blade he or she would like to use, the working tip, and locks the slidable collar body 172 in place at the end of the long slender section 140 opposite the working tip end by screwing the internal threads 200 of the slidable collar body 172 onto external threads 190 at that end of the punch-down blade 120. Torque sufficient to removably lock the slidable collar 172 into place on the body of the punch-down blade 120 is applied through the use of finger pressure, or through the use of a tool such as a wrench or pliers. Then the non-working tip is inserted into the punch-down tool so that the biased cam follower member of the tool is aligned with the lead-in detent 178 of the collar body L-shaped groove 176, moving the punch-down tool blade 120 further inside the receptacle of the punch-down tool (not shown), with clockwise torque applied to the punch-down blade 120 with respect to the punch-down tool, so that the cam follower rides up and over the cam surface 182 and into the locking detent 180 of the collar body L-shaped groove 176, thus reversibly locking the punch-down blade 120 into place with respect to the punch-down tool. The tool is now ready for use and can efficiently seat or seat and cut wires into terminal clips of crowded patch panels efficiently without tangling the device in the wires, or inadvertently seating to the incorrect terminal clip because the punch-down tool obstructs the tradesman's vision of terminal clips.

When the tradesman wishes to use the other tip (e.g. the other tip will become the working tip), he or she simply reverses the assembly steps above, e.g. applies counterclockwise torque to the punch-down blade 120 relative to the punch-down tool, removes the punch-down blade 120 from the punch-down tool, and loosens the slidable collar body 172 with respect to the external threads 190 using finger pressure or a torque-applying tool such as a pliers or wrench. Then the tradesman slides the slidable collar body 172 to the other end of the punch-down blade 120, tightens the slidable collar body 172 on the second set of external threads 190. Then the non-working blade end is inserted into the punch-down tool so that the cam follower member of the tool is aligned with the lead-in detent 178 of the second, opposite facing, collar body L-shaped groove 176 of the slidable collar body 172, moving the punch-down tool blade 120 further inside the receptacle of the punch-down tool, with clockwise torque applied to the punch-down blade 120 with respect to the punch-down tool, so that the cam follower rides up and over the cam surface 182 and into the locking detent 180 of the collar body L-shaped groove 176, thus reversibly locking the punch-down blade 120 into place with respect to the punch-down tool. Now the tool is ready for use in its alternate configuration.

It should be understood that even though these numerous characteristics and advantages of various embodiments have been set forth in the foregoing description, together with details of the structure and function of the embodiments, the disclosure is illustrative only, and changes may be made in detail, especially in matters of shape, size and arrangement of parts within the principals of the invention(s) claimed in the appended claims to the full extent indicated by the broad general meaning of the terms in which the appended claims are expressed.

What is claimed is:

1. A blade for a punch-down tool, the blade comprising:

a first end that has a seating edge for seating a wire into a terminal, an elongated slot, and a groove;

a second end that has a seating edge for seating a wire into a terminal, a cutting edge, an elongated slot, and a groove;

an elongated section that joins the first end to the second end; and a locking collar section located along the elongated section and configured to reversibly fix the blade into a punch-down tool in a manner so that the first end is proximate to the punch-down tool and the second end is distal from the punch-down tool, and also in a manner so that the first end is distal to the punch-down tool and the second end is proximate to the punch-down tool;

the locking collar section being configured to be locked to the elongated section at a first location proximate to the first end and at a second location proximate the second end, and the locking collar section being configured so as to be slidably movable along the elongated section from the first location to the second location and from the second location to the first location when the locking collar section is not locked to the elongated section.

2. The blade of claim 1 where, the locking collar section includes grooves for the fixing of the blade into the punch-down tool.

3. The blade of claim 1 where the blade has an overall length from 4 inches to 10 inches.

4. The blade of claim 1 where the blade has an overall length from 5 inches to 9 inches.

5. The blade of claim 1 where the blade has an overall length from 7 inches to 7.5 inches.

6. The blade of claim 1, where the locking collar section contains a spring which biases a ball, and where the elongated section contains a groove, wherein there is a cam and a detent that are disposed at each end of the groove, proximate the respective first and second ends of the blade, and where the biased ball travels in the groove and is used to selectively lock the locking collar section at respective ends of the elongated section that are proximate the first end and the second end, respectively, of the blade by traveling over the cam that is proximate the first end and the second end, respectively, of the blade and into the detent that is proximate the first end and the second end, respectively, of the blade.

7. The blade of claim 1, where the locking collar section contains internal threads and the elongated section contains external threads, where the locking collar section may be selectively locked to the elongated section at the first end of the blade and at the second end of the blade by threading the locking collar section on to the elongated section.

8. A blade for a punch-down tool, the blade comprising:

means for seating a wire into a terminal of a terminal block, said means for seating being located at a first end of the blade;

means for seating and cutting a wire at a terminal of a terminal block, said means for seating and cutting being located at a second end of the blade;

means for facilitating the movement of a locking collar for locking the blade to the punch-down tool, which movement is along an elongated section of the blade, where the elongated section connects the first end and the second end of the blade; and means for reversibly fixing the locking collar to the elongated section of the blade at a first location proximate to the first end of the blade and at a second location proximate the second end of the blade, the locking collar being configured so as to be slidably movable along the elongated section from the first location to the second location and from the second location to the first location when the locking collar is not fixed to the elongated section.

9. The blade of claim 8 where the means for reversibly fixing the locking collar are provided proximate the first end and proximate the second end of the blade.

10. The blade of claim 9 where the means for facilitating the movement of the locking collar along the elongated section and the means for reversibly fixing the locking collar section comprise a cam and detent mechanism.

11. The punch-down tool of claim 10 where the cam and detent mechanism includes:

a detent groove within the elongated section, a collar locking cam disposed at each end of the detent groove, a collar locking detent disposed adjacent to each collar locking cam, on the opposite side of the respective collar locking cam from the detent groove; and the locking collar includes an elastically biased member, and the locking collar also includes a means for applying an elastic bias, the elastically biased member riding within the detent groove and being capable of riding over each of the collar locking cams and into the respective collar locking detent.

12. The blade of claim 9 where the means for reversibly fixing the locking collar comprise a locking thread mechanism.

13. The blade of claim 9 where the means for reversibly fixing the locking collar comprise a bayonet mechanism.

14. The punch-down tool of claim 8 where the means for reversibly locking the locking collar include:

external threads located at the first location proximate the first end and external threads located at the second location proximate the second end of the blade, wherein the first and second locations are between the elongated section and the first and the second ends, respectively;

threads internal to the locking collar for selectively threading onto the external threads at the first location and at the second location; and wherein the means for facilitating the movement of the locking collar include:

a clearance between the outer surface of the elongated section and the internal diameter of the internal threads which allows the slidable collar body to freely slide along the elongated section of the tool.

* * * * *